Feb. 7, 1961 G. ACHILLES 2,970,588
ADJUSTMENT APPARATUS FOR DRESSING TOOL SUPPORT
Filed Feb. 18, 1960 3 Sheets-Sheet 1

INVENTOR.
Günter Achilles
BY
Michael S. Striker
Attorney

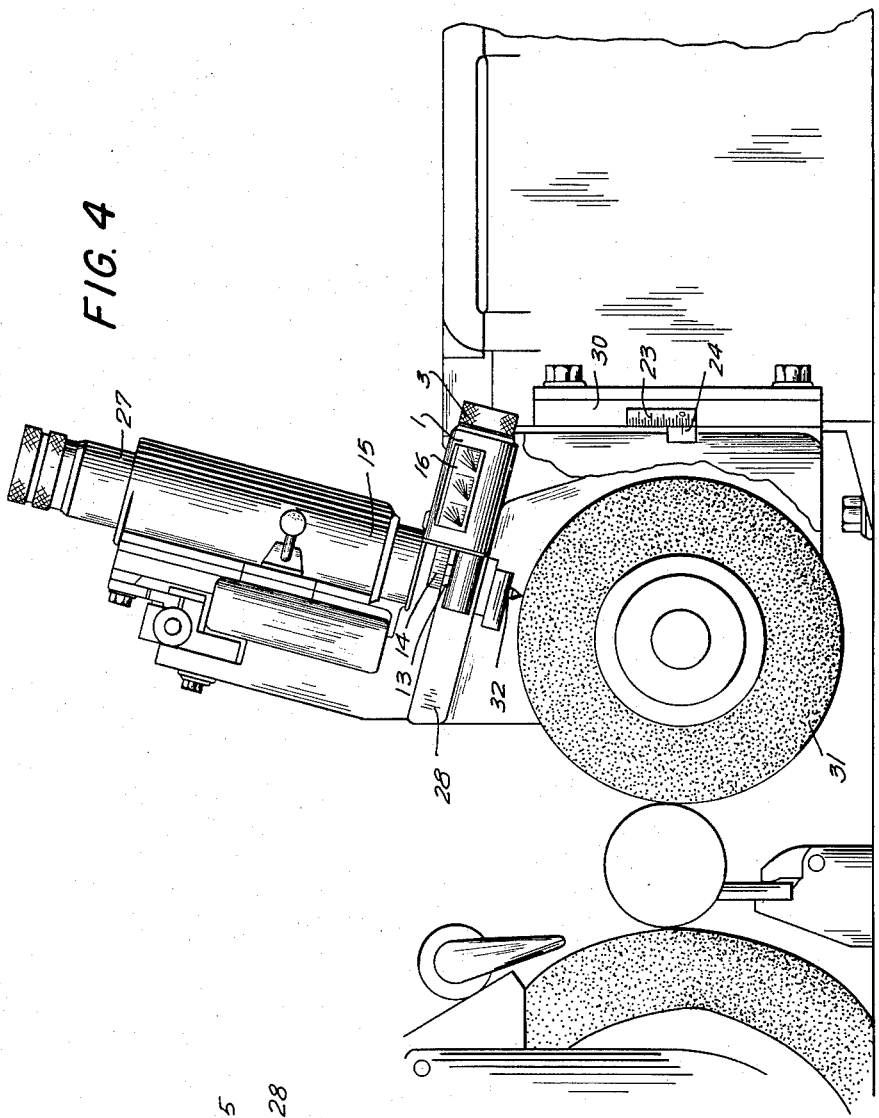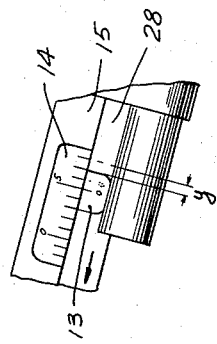

Feb. 7, 1961 G. ACHILLES 2,970,588
ADJUSTMENT APPARATUS FOR DRESSING TOOL SUPPORT
Filed Feb. 18, 1960 3 Sheets-Sheet 3

INVENTOR.
Günter Achilles
BY
Michael S. Striker
Attorney

United States Patent Office 2,970,588
Patented Feb. 7, 1961

2,970,588
ADJUSTMENT APPARATUS FOR DRESSING TOOL SUPPORT

Günter Achilles, Berlin-Mariendorf, Germany, assignor to Firma R. Stock & Co., Spiralbohrer-, Werkzeug- und Maschinenfabrik Aktiengesellschaft, Berlin-Marienfelde, Germany Filed Feb. 18, 1960, Ser. No. 9,466
Claims priority, application Germany Feb. 19, 1959
15 Claims. (Cl. 125—11)

The present invention relates to an adjustment apparatus for a dressing tool support, and more particularly to an apparatus for adjusting the zero-mark of the scale of the support of a dressing tool for a grinding wheel.

When a cylindrical workpiece is ground, the axis of the grinding wheel is set at an angle to the axis of the workpiece. The grinding wheel has a hyperboloid shape in order to obtain a straight line of engagement between the workpiece and the grinding wheel.

When the grinding wheel is dressed, the diamond of the dressing tool produces a hyperboloid if the axis of the grinding wheel extends at the same angle to the diamond, as to the workpiece during the grinding operation. However, since the line of engagement of the diamond of a dressing tool corresponds to a workpiece having an infinitely small diameter, the hyperboloid surface produced by dressing is not the hyperboloid surface required for performing an accurate grinding operation on a workpiece having a particular diameter. The hyperboloid surface produced by the dressing tool is consequently only acceptable for small workpieces having a small diameter, and requiring a small angle to the axis of the grinding wheel. However, if workpieces of greater diameter are ground at a substantial angle to the axis of the grinding wheel, and by a large diameter grinding wheel of substantial axial length, the error introduced by the difference in diameter between the workpiece and the dressing tool, can no longer be neglected.

It is the object of the present invention to provide an adjustment apparatus by which the support of the dressing tool is adjusted in such a manner that the dressed surface of the grinding wheel has a shape corresponding to the diameter of a workpiece to be ground.

The desired adjustment can be obtained by changing the angle at which the dressing tool extends to the grinding wheel. According to the prior art, correction factors are found in voluminous tables, whereupon the support of the dressing tool is correspondingly adjusted. However, the use of tables is time-consuming, and may lead to errors.

It is another object of the present invention to overcome the disadvantages of the prior art serving the same purpose, and to provide an adjustment apparatus for a dressing tool support in which the zero mark of the dressing tool support is adjusted in accordance with relatively movable indicia.

It is another object of the present invention to obtain the correction of the position of the zero mark by a movable means having graphs thereon which move relative to a stationary scale as the zero mark is adjusted.

A further object of the present invention is to provide the apparatus with graphs and scales relating to all factors which influence the necessary angle of the dressing tool support. Such factors are, for example, the diameter of the grinding wheel, the angle of the dressing tool to the workpiece, and the diameter of the used grinding wheel.

A further object of the present invention is to provide an apparatus by which the zero mark for the dressing tool support is shifted through a distance corresponding to the required correction angle.

With these objects in view, the apparatus of the present invention comprises a first movable member for supporting a dressing tool; a second member movable relative to the first member, a first means having first indicia thereon; a second means having second indicia thereon and being movable relative to the first means between a plurality of positions in which the indicia are in different relative positions corresponding to factors influencing the required relative position between the grinding wheel and the dressing tool; and means for operatively connecting the second means to the second member for movement therewith for displacing the latter relative to the first member a distance proportional to the movement of the second means. Preferably, the first member which supports the dressing tool has a scale indicating angular positions of the dressing tool relative to the axis of the grinding wheel, while the second member has a zero mark cooperating with the scale.

When the first and second indicia are moved relative to each other to a selected position under consideration of the factors influencing the angle between the grinding wheel and the dressing tool, the zero mark is shifted, and when the member supporting the dressing tool is set in accordance with the adjusted zero mark, the relative position between the dressing tool and the grinding wheel is corrected so that the grinding operation is accurately carried out.

In the preferred embodiment of the present invention, the first indicia include at least one group of angularly spaced lines which are respectively related to different angles between the dressing tool and the grinding wheel. Several groups of angularly spaced lines may be provided, wherein each group is related to a grinding wheel having a different diameter.

The second indicia include at least one scale line related to the respective grinding wheel, and having graduated lines representing different diameters of different workpieces to be ground by the respective grinding wheel.

Several scale lines may be provided, and such scale lines are respectively associated with grinding wheels of different diameter to which the groups of angularly spaced lines are respectively related.

The scale lines are preferably provided on a transparent window, so that the respective selected group of angularly spaced lines can be shifted until a selected line crosses a selected graduation line of the respective scale line. In this manner, the correction factor for the diameter of the workpiece, and for the angle between the dressing tool and the grinding wheel is considered. Such correction is fully accurate only for a grinding wheel having a certain diameter, so that for each grinding wheel, a group of angularly spaced lines and a scale line has to be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a front view of a dressing arrangement to which the present invention is applied;

Fig. 7 is a fragmentary view illustrating a scale and a zero mark adjusted in accordance with the present invention.

Figure 5:
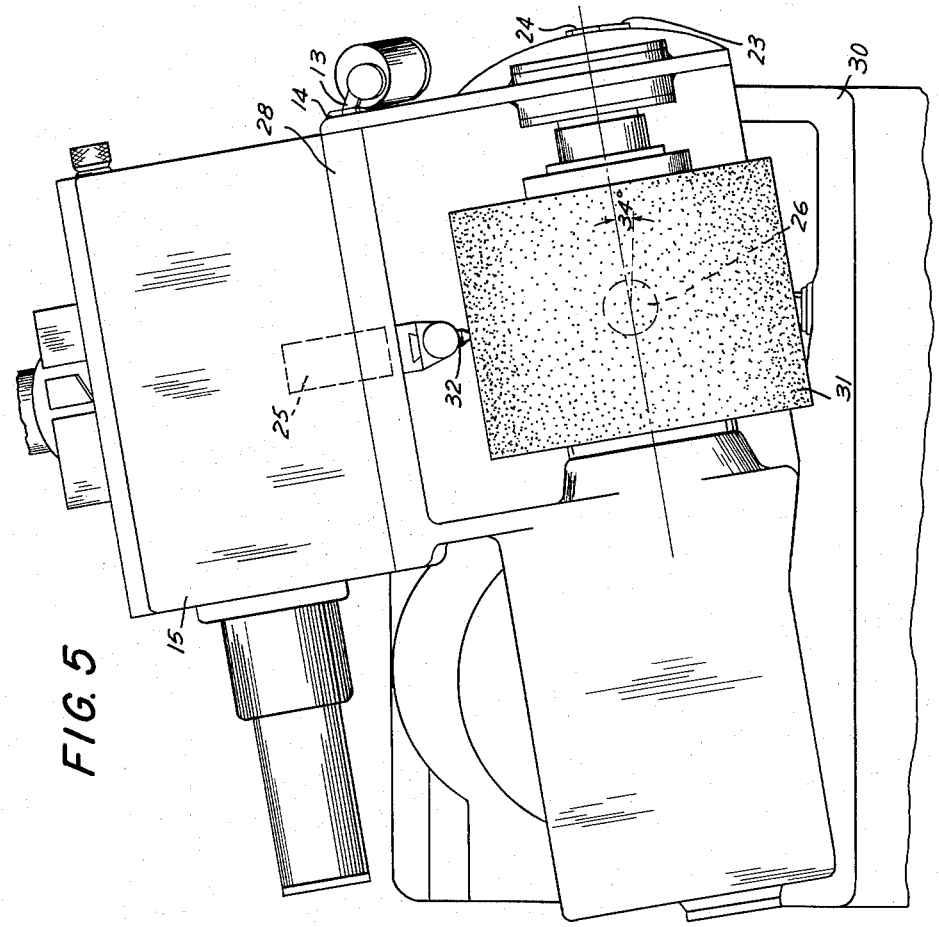
Fig. 5 is a side view of the dressing arrangement shown in Fig. 4.

Referring now to the drawings, and more particularly to Figs. 4 and 5, a grinding wheel 31 is mounted on a support 28 which is turnable about a pivot member 26 secured to a carriage 30. The turning angle of support 28 relative to carriage 30 can be read by means of mark 24 on support 28 and scale 23 on carriage 30.

The dressing device 15 is mounted on support 28 for turning movement about a pivot pin 25. The relative angular position between support 28 and dressing device 15 can be read on the scale 14 on dressing device 15 and is indicated by the zero mark 13 which is part of the adjusting device of the present invention, and can be shifted by operation of knob 3, as will be explained hereinafter in greater detail.

The dressing device 15 has an adjustable tool support 27 carrying the diamond 32 by which the grinding wheel 31 is dressed.

Fig. 4 illustrates support 28 and grinding wheel 31 in an initial position in which the zero mark 24 coincides with the zero point of scale 23.

Figure 6:
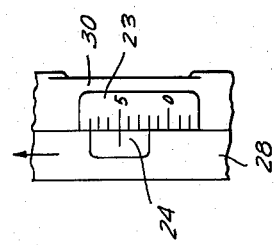
Fig. 6 is a fragmentary view on an enlarged scale showing a scale used in the arrangement of Fig. 4.

Fig. 6 illustrates the mark 24 and the scale 23 in a position in which support 28 is turned through 5°. Fig. 7 illustrates a position in which the zero mark 13 has been adjusted a distance y whereupon the dressing device 15 was turned until the line corresponding to the angle of 5° coincided with the adjusted zero mark.

Figure 1:
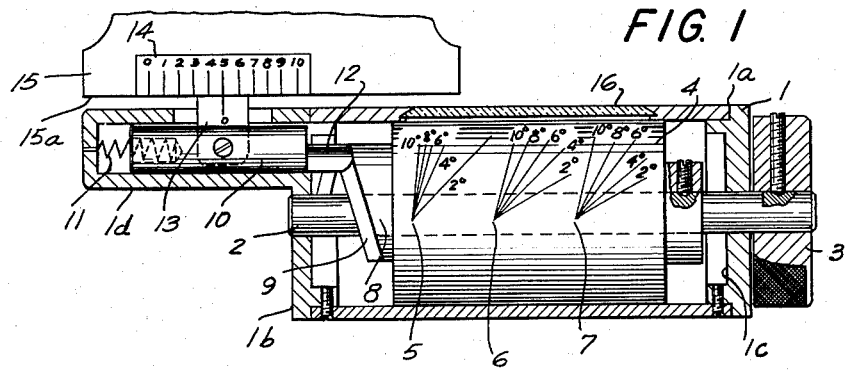
Fig. 1 is a sectional view illustrating an embodiment of the adjustment apparatus of the present invention.
Figure 2:
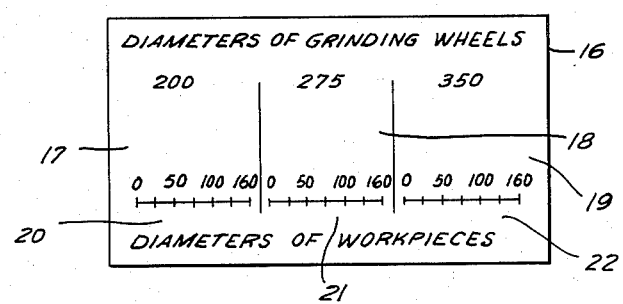
Fig. 2 is a schematic view illustrating a transparent window provided with indicia and used in the embodiment of Fig. 1.
Figure 3:
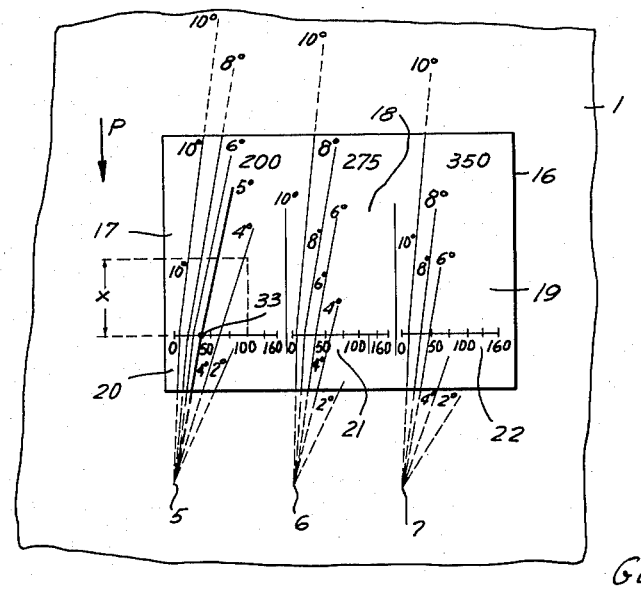
Fig. 3 is a front view showing a detail of the embodiment of Fig. 1 on an enlarged scale.

The adjustment device has a tubular housing 1 secured to support 28, as shown in Figs. 4 and 5. As shown in Figs. 1, 2 and 3, housing member 1 has a cutout 1a in which a transparent window 16 is mounted. The end plates 1b and 1c have bearing bores in which a shaft 2 is turnably mounted. A manually operated knob 3 is secured to the shaft 2 so that a cylindrical drum 4, which is fixed on shaft 2, can be turned by operation of knob 3. The cylindrical surface of the drum 4 has three groups of intersecting angularly spaced lines 5, 6 and 7. Each line within a group 5, 6 and 7 is related to a particular angle, for example, to the angles 2°, 4°, 6°, 8° and 10°. The points of intersection of the three groups are located on an axially extending line.

One end face of the cylindrical drum 4 has fixed thereon a part-circular wall whose center coincides with the turning axis of shaft 2. The edge 9 of wall 8 has successive points thereof displaced in axial direction so as to form a cam track of substantially helical shape. A cam follower pin 10 is guided in a bore of tubular extension 1d of end wall 1b for movement parallel to the axis of shaft 2. A spring 11 is located in extension 1d to urge the cam follower pin 10 into engagement with the cam track 9. It is evident that turning of knob 3 will effect turning of the cam means 8, 9 and axial displacement of the cam follower pin 10.

Cam follower pin 10 is fixed to a zero mark member 13 which is movable along the end face of dressing device 15. Member 13 carries a zero mark cooperating with the scale 14 on dressing device 15. Assuming that the zero mark member 13 were fixed, the dressing tool could be set to a desired angle by turning dressing device 15 until the respective angle coincides with the zero mark on member 13.

However, if the zero mark were fixed, the setting of the dressing tool could not be corrected in accordance with the specific grinding wheel used, and in accordance with the diameter of the workpiece.

The transparent window 16 has three adjacent areas 17, 18 and 19, each of which is associated with a particular grinding wheel having a certain diameter. Diameters of 200 mm., 275 mm., and 350 mm. are indicated in Fig. 2 in the areas 17, 18 and 19, respectively. Three scale lines 20, 21 and 22 are provided in the areas 17, 18 and 19 and are aligned in axial direction of the turning axis of shaft 2. Each scale line has a number of graduated lines respectively indicating diameters of different workpieces.

Fig. 3 shows the transparent window 16 superimposed on the groups of angularly spaced intersecting lines 5, 6 and 7 on the cylindrical surface of drum member 4. This position can be easily obtained by turning knob 3. Fig. 3 clearly shows that each group of intersecting lines 5, 6 and 7 is arranged and spaced in axial direction in such a manner as to be located underneath the respective corresponding area 17, 18 or 19 of the transparent window 16. The group of lines 5 is, of course, related to the same diameter 200 of the grinding wheel to which the scale line 20 is related. Each line of each group is related to an angle between the dressing tool and the grinding wheel.

The apparatus is operated as follows:

In the position illustrated in Fig. 3, drum 4 has been turned until the line representing 5° belonging to the group 5 associated with the grinding wheel of 200 mm. diameter, crosses the scale line 20 in area 17 at a point representing a workpiece of 35 mm. diameter. The line representing 5° has been selected, since it is assumed that support 28 and grinding wheel 31 are to be turned relative to carriage 30 in a position defining an angle of 5° which is read on scale elements 23 and 24 as shown in Fig. 6. Turning of the drum 4 by knob 3 to the position illustrated in Fig. 3 has effected shifting of the zero mark 13 a distance y shown in Fig. 7. It is now necessary to turn the dressing device until the scale line 5 coincides with the shifted zero mark 13 as shown in Fig. 7 whereby the dressing device and the diamond 32 are in an adjusted position in which a 200 mm. grinding wheel is dressed along a surface shaped as required by a workpiece having a diameter of 35 mm. and where the grinding wheel 31 extends at an angle of 5° to the workpiece.

If it is desired to adjust the dressing device to a workpiece having a diameter of 100 mm., and that the angle between the dressing tool and the grinding wheel is to be 4°, and assuming that the groups of lines 5, 6 and 7 are in the position shown in Fig. 3, then the line related to the angle of 4° in the area 17 is spaced a distance x from the graduated line 100 corresponding to the diameter of the workpiece. Knob 3 is turned until the line representing 4° intersects the scale line 20 at the graduated line 100. During this turning movement of drum 4, cam 8 also turns so that the cam follower pin 10 is shifted in axial direction by the helical cam track 9 through a distance corresponding to the turning angle of the turnable member 2, 4. Since zero mark member 13 moves with cam follower pin 10, the zero mark is displaced relative to the scale 14.

When the setting of the dressing tool is based on the thus shifted zero mark, that is, if graduated line 4 on scale 14 is made to coincide with the shifted zero mark by turning the support 15, then the dressing tool extends at a corrected angle to the grinding wheel. After a dressing operation carried out in this relative position of the dressing tool and of the grinding wheel, the hyperboloid surface of a grinding wheel having a diameter of 200 mm. will be dressed to such shape as to accurately grind a workpiece having a diameter of 100 mm. when extending at an angle 4° to the workpiece.

From the above description of a preferred embodiment of the present invention it will become apparent that member 13 is movable relative to member 15 which supports a dressing tool, and that one of said members has a scale 14 and the other of said members has a zero mark. The cam means 8, 9 and the cam follower pin 10 constitute means for operatively connecting the means 2, 4, 5, 6, 7 to member 13. Knob 3 constitutes an operating means for moving the means 2, 4, and particularly the indicia 5, 6, 7 relative to means 1, 16 and more particularly relative to the indicia 20, 21, 22.

It will be understood that each of the elements described above, or two or more together, may also find a useful application in other types of adjusting apparatus for adjusting the relative position between a scale and a zero mark in accordance with correction factors differing from the type described above.

While the invention has been illustrated and described as embodied in an apparatus for adjusting the position of a dressing tool support under consideration of the diameter of the workpiece and the angle between a workpiece and grinding wheel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be secured by Letters Patent is:

1. In an apparatus of the type described, in combination, a first movable member for supporting a dressing tool; a second member movable relative to said first member, one of said members having a scale, and the other of said members having a zero mark for said scale, the position of said scale relative to said zero mark representing the position of the dressing tool in relation to a grinding wheel; a first means having first indicia thereon; a second means having second indicia thereon and being movable relative to said first means between a plurality of positions in which said first and second indicia are in different relative positions corresponding to factors influencing the required relative position between the grinding wheel and the dressing tool; operating means for moving said second means relative to said first means until said first and second indicia assume a selected relative position; and means for operatively connecting said second means to said second member for movement therewith for displacing the latter relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said first and second indicia.

2. In an apparatus of the type described, in combination, a first movable member for supporting a dressing tool; a second member movable relative to said first member, one of said members having a scale, and the other of said members having a zero mark for said scale, the position of said scale relative to said zero mark representing the position of the dressing tool in relation to a grinding wheel; a first means having first indicia thereon; a second means having second indicia thereon and being movable relative to said first means between a plurality of positions in which said first and second indicia are in different relative positions corresponding to factors influencing the required relative position between the grinding wheel and the dressing tool; operating means for moving said second means relative to said first means until said first and second indicia assume a selected relative position; cam means secured to said second means for movement therewith; and cam follower means engaging said cam means and being operatively connected to said second member for movement therewith, said cam means displacing said cam follower means and thereby said second member relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said first and second indicia.

3. An apparatus as set forth in claim 2, wherein said second means is turnable relative to said first means between said positions; and wherein said cam means has a part-circular cam track concentric with the turning axis of said second means and cooperating with said cam follower means.

4. An apparatus as set forth in claim 2 wherein said cam follower means includes a spring-loaded pin engaging said cam means and being secured to said second member for movement therewith.

5. In an apparatus of the type described, in combination, a first movable member for supporting a dressing tool; a second member movable relative to said first member, one of said members having a scale, and the other of said members having a zero mark for said scale, the position of said scale relative to said zero mark representing the position of the dressing tool in relation to a grinding wheel; a first means including a transparent window having first indicia thereon; a second means having second indicia thereon and being movable relative to said first means between a plurality of positions in which said first and second indicia are in different relative positions corresponding to factors influencing the required relative position between the grinding wheel and the dressing tool; operating means for moving said second means relative to said first means until said first and second indicia assume a selected relative position; and means for operatively connecting said second means to said second member for movement therewith for displacing the latter relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said first and second indicia.

6. In an apparatus of the type described, in combination, a first movable member for supporting a dressing tool; a second member movable relative to said first member, one of said members having a scale, and the other of said members having a zero mark for said scale, the position of said scale relative to said zero mark representing the angular position of the dressing tool in relation to a grinding wheel; a first means including a transparent window and having first indicia thereon associated with at least one grinding wheel having a selected diameter and including a scale line having graduated lines representing different diameters of different workpieces to be ground by the grinding wheel; a second means having a group of angularly spaced lines thereon and being movable relative to said first means between a plurality of positions in which said scale line and said group of angularly spaced lines are in different relative positions corresponding to factors influencing the required relative position between the grinding wheel and the dressing tool; operating means for moving said second means relative to said first means until said scale line and said group of angularly spaced lines assume a selected relative position; and means for operatively connecting said second means to said second member for movement therewith for displacing the latter relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said scale line and said group of angularly spaced lines.

7. An apparatus as set forth in claim 6, wherein said second means is a cylindrical drum having said group of angularly spaced lines on a portion of the cylindrical surface thereof; and wherein said first means is tubular and envelops said cylindrical drum, said transparent window being curved, and wherein said cylindrical drum is turnable about an axis coinciding with the axis of said tubular means for moving said portion of said cylindrical surface of said drum across said window.

8. In an apparatus of the type described, in combination, a first movable member for supporting a dressing tool; a second member movable relative to said first member, one of said members having a scale, and the other of said members having a zero mark for said scale, the position of said scale relative to said zero mark representing the angular position of the dressing tool in relation to a grinding wheel; a first means including a transparent window and having first indicia thereon associated with at least one grinding wheel having a selected diameter and including a scale line having graduated lines representing different diameters of different workpieces to be ground by the grinding wheel; a second means having a group of angularly spaced lines thereon and being movable relative to said first means between a plurality of positions in which said scale line and said group of angularly spaced lines are in different relative positions corresponding to factors influencing the required relative position between the grinding wheel and the dressing tool; operating means for moving said second means relative to said first means until said scale line and said group of angularly spaced lines assume a selected relative position; cam means secured to said second means for movement therewith; and cam follower means engaging said cam means and being operatively connected to said second member for movement therewith, said cam means displacing said cam follower means and thereby said second member relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said scale line and said group of angularly spaced lines.

9. In an apparatus of the type described, in combination, a first movable member for supporting a dressing tool; a second member movable relative to said first member, one of said members having a scale, and the other of said members having a zero mark for said scale, the position of said scale relative to said zero mark representing the angular position of the dressing tool in relation to a grinding wheel; a first means having first indicia thereon associated with at least one grinding wheel having a selected diameter and including a scale line having graduated lines representing different diameters of different workpieces to be ground by the grinding wheel; a second means having second indicia including a group of angularly spaced lines respectively representing different angles, said second means being movable relative to said first means between a plurality of positions in which said scale line and said group of angularly spaced lines are in different relative positions corresponding to factors influencing the required relative position between the grinding wheel and the dressing tool; operating means for moving said second means relative to said first means until said scale line and said group of angularly spaced lines assume a selected relative position; and means for operatively connecting said second means to said second member for movement therewith for displacing the latter relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of said scale line and said group of angularly spaced lines.

10. In an apparatus of the type described, in combination, a first movable member for supporting a dressing tool; a second member movable relative to said first member, one of said members having a scale, and the other of said members having a zero mark for said scale, the position of said scale relative to said zero mark representing the angular position of the dressing tool in relation to a grinding wheel; a first means having first indicia thereon including a plurality of scale lines respectively related to said grinding wheels having different diameters, each scale line having graduated lines representing different diameters of different workpieces to be ground by the respective grinding wheel; a second means having second indicia thereon including a plurality of groups of angularly spaced lines respectively related to different angles between the dressing tool and the axis of the grinding wheel, each group relating to a grinding wheel having a different diameter, said second means being movable relative to said first means between a plurality of positions in which a selected scale line and the respective group of angularly spaced lines are in different relative positions corresponding to factors influencing the required relative position between the grinding wheel and the dressing tool; operating means for moving said second means relative to said first means until the selected scale line and the respective group of angularly spaced lines assume a selected relative position; and means for operatively connecting said second means to said second member for movement therewith for displacing the latter relative to said first member a distance proportional to the movement of said second means so as to change the relative position between said scale and said zero mark whereby by setting of said first member according to said relatively shifted zero mark, the relative position between the dressing tool and the grinding wheel is corrected in accordance with the selected relative position of the selected scale line and the respective group of angularly spaced lines.

11. In an apparatus for positioning a dressing tool relative to a grinding wheel, in combination, a turnable support for supporting a dressing tool and having a scale thereon representing angular positions of the dressing tool in relation to the axis of a grinding wheel; a zero mark member movable relative to said support and having a zero mark thereon moving along said scale during movement of said zero mark member, said scale moving relative to said zero mark during turning of said support; a stationary member having at least one scale line thereon associated with a grinding wheel having a selected diameter, said scale line having graduated lines related to different workpieces having different diameters; a turnable member mounted on said stationary member for turning movement, said turnable member having at least one group of intersecting lines thereon related to the selected grinding wheel, each of said lines relating to a different angle between the axis of the grinding wheel and the dressing tool and extending transverse to said scale line; means operatively connecting said turnable member with said zero mark member so that said zero mark member is moved a distance proportional to the turning angle of said turnable member to change the relative position between said zero mark and said scale; and operating means for turning said turnable member relative to said stationary member until said scale line assumes a selected position relative to a selected line of said group of intersecting lines so that said zero mark is shifted whereby by setting of said support according to said shifted zero mark, the angle between the dressing tool and the axis of the grinding wheel is corrected in accordance with the selected position of each scale line and selected intersecting line.

12. In an apparatus for positioning a dressing tool relative to a grinding wheel, in combination, a turnable support for supporting a dressing tool and having a scale thereon representing angular positions of the dressing tool in relation to the axis of a grinding wheel; a zero mark member movable relative to said support and having a zero mark thereon moving along said scale during movement of said zero mark member, said scale moving relative to said zero mark during turning of said support; a stationary member having at least one scale line thereon associated with a grinding wheel having a selected diameter, said scale line having graduated lines related to different workpieces having different diameters; a turnable member mounted on said stationary member for turning movement, said turnable member having at least one group of intersecting lines thereon related to the selected grinding wheel, each of said lines relating to a different angle between the axis of the grinding wheel and the dressing tool and extending transverse to said scale line; cam means secured to said turnable member for turning movement therewith and having a part-circular cam track concentric with the turning axis of said turnable member; a cam follower member mounted on said stationary member for movement in axial direction of said turnable member and being secured to said zero mark member so that the same is moved a distance proportional to the turning angle of said turnable member to change the relative position between said zero mark and said scale; and operating means for turning said turnable member relative to said stationary member until said scale line assumes a selected position relative to a selected line of said group of intersecting lines so that said zero mark is shifted whereby by setting of said support according to said shifted zero mark, the angle between the dressing tool and the axis of the grinding wheel is corrected in accordance with the selected position of said scale line and selected intersecting line.

13. In an apparatus for positioning a dressing tool relative to a grinding wheel, in combination, a turnable support for supporting a dressing tool and having a scale thereon representing angular positions of the dressing tool in relation to the axis of a grinding wheel; a zero mark member movable relative to said support and having a zero mark thereon moving along said scale during movement of said zero mark member, said scale moving relative to said zero mark during turning of said support; a stationary tubular member having a curved transparent window, said window having at least one scale line thereon associated with a grinding wheel having a selected diameter, said scale line having graduated lines related to different workpieces having different diameters; a turnable cylindrical drum member mounted on said stationary member for turning movement about a turning axis parallel to said scale line, said cylindrical drum member having at least one group of intersecting lines thereon related to the selected grinding wheel, each of said lines relating to a different angle between the axis of the grinding wheel and the dressing tool and extending transverse to said scale line; means operatively connecting said cylindrical drum member with said zero mark member so that said zero mark member is moved a distance proportional to the turning angle of said cylindrical drum member to change the relative position between said zero mark and said scale; and operating means for turning said cylindrical drum member relative to said stationary member until said scale line assumes a selected position relative to a selected line of said group of intersecting lines so that said zero mark is shifted whereby by setting of said support according to said shifted zero mark, the angle between the dressing tool and the axis of the grinding wheel is corrected in accordance with the selected position of said scale line and selected intersecting line.

14. In an apparatus for positioning a dressing tool relative to a grinding wheel, in combination, a turnable support for supporting a dressing tool and having a scale thereon representing angular positions of the dressing tool in relation to the axis of a grinding wheel; a zero mark member movable relative to said support and having a zero mark thereon moving along said scale during movement of said zero mark member, said scale moving relative to said zero mark during turning of said support; a stationary tubular member having a curved transparent window, said window having at least one scale line thereon associated with a grinding wheel having a selected diameter, said scale line having graduated lines related to different workpieces having different diameters; a turnable cylindrical drum member mounted on said stationary member for turning movement about a turning axial parallel to said scale line, said cylindrical drum member having at least one group of intersecting lines thereon related to the selected grinding wheel, each of said lines relating to a different angle between the axis of the grinding wheel and the dressing tool and extending transversely to said scale line; cam means secured to said cylindrical drum member for turning movement therewith and having a part-circular cam track concentric with the turning axis of said cylindrical drum member; a cam follower member mounted on said stationary member for movement in axial direction of said cylindrical drum member and being secured to said zero mark member so that the same is moved a distance proportional to the turning angle of said cylindrical drum member to change the relative position between said zero mark and said scale; and operating means for turning said cylindrical drum member relative to said stationary member until said scale line assumes a selected position relative to a selected line of said group of intersecting lines so that said zero mark is shifted whereby by setting of said support according to said shifted zero mark, the angle between the dressing tool and the axis of the grinding wheel is corrected in accordance with the selected position of said scale line and selected intersecting line.

15. An apparatus as set forth in claim 14 wherein said transparent window has a plurality of aligned scale lines thereon having graduated lines representing different diameters of workpieces, each scale line relating to a different grinding wheel having a different diameter; and wherein said cylindrical drum member has a plurality of groups of intersecting lines thereon, each group being related to one of said different grinding wheels and to one of said scale lines, each group of intersecting lines moving across the respective related scale line when said cylindrical drum member is turned.

No references cited.